United States Patent [19]

Lizell

[11] Patent Number: 4,597,411

[45] Date of Patent: Jul. 1, 1986

[54] RESTRICTION VALVE DEVICE FOR HYDRAULIC PRESSURE FLUIDS IN VEHICLE SHOCK ABSORBING MECHANISMS

[76] Inventor: Magnus Lizell, Svalnäsvägen 13, S-182 63 Djursholm, Sweden

[21] Appl. No.: 775,895

[22] Filed: Sep. 13, 1985

[30] Foreign Application Priority Data

Dec. 7, 1984 [SE] Sweden ............................. 8406224

[51] Int. Cl.[4] .............................................. F16F 9/46
[52] U.S. Cl. .................................. 137/493.8; 137/516; 137/516.15; 188/299; 188/322.14
[58] Field of Search ........... 188/276, 279, 299, 322.13, 188/322.14; 137/516, 496, 516.15, 493.8, 522; 417/298, 446

[56] References Cited

U.S. PATENT DOCUMENTS

2,890,715 6/1959 Ebersold ........................ 137/522 X
3,256,960 6/1966 Casimir ............................... 188/299

FOREIGN PATENT DOCUMENTS

123365 10/1984 European Pat. Off.
173629 4/1981 Japan.
180011 5/1922 United Kingdom ............... 417/298
2112104 7/1983 United Kingdom.

Primary Examiner—Robert G. Nilson
Attorney, Agent, or Firm—Pollock, Vande Sande and Priddy

[57] ABSTRACT

A restriction valve device for hydraulic pressure fluid in a vehicle shock absorbing mechanism comprises a valve seat member with at least one main opening for the passage of said pressure fluid, said main opening being closable by means of a movable spring-biased valve body, and at least one auxiliary opening for the pressure fluid, said auxiliary opening being selectively closable by a closure element. To provide for a fast and reliable change or control of the functional characteristics of the damper, yet making same inexpensive and uncomplicated, a closed variable space is confined between the valve seat member and the valve body, the auxiliary opening being connected with said space so as to admit when the closure element is open, the pressure fluid thereinto and thus apply also the pressure of said fluid onto said valve body to effect an increased pressure force on said body against the force of the biasing spring so as to change the functional characteristics of the restriction valve device.

10 Claims, 2 Drawing Figures

RESTRICTION VALVE DEVICE FOR HYDRAULIC PRESSURE FLUIDS IN VEHICLE SHOCK ABSORBING MECHANISMS

BACKGROUND OF THE INVENTION

The present invention refers to a restriction valve device for hydraulic pressure fluids in vehicle shock absorbing mechanisms comprising a valve seat member with at least one main opening for the passage of said pressure fluid, said main opening being closable by means of a movable spring-biased valve body, and at least one auxiliary opening for the pressure fluid, said auxiliary opening being selectively closable by a closure element.

Restriction valve devices of this kind are previously known. As far as shock absorbers for vehicles and the like are concerned it is often desirable that the damping action obtained be variable so that the shock absorber can be adapted as requested to various requirements. As is known, the damping action of hydraulic shock absorbers is obtained by intentionally restricting the flow of the hydraulic liquid between various chambers to either side of a movable piston or the like by means of a restriction valve device. Most often a flow passage or a plurality of circumferentially spaced openings are closeable by means of a valve body which is spring-biased towards a closed position. By varying the number of openings and/or their crosssectional area, a flow resistance and hence a restricting action of desired, predetermined characteristics can be obtained.

Particularly when it comes to vehicle shock absorbers it is also desirable however, that the damping action be controllable. Almost without any exceptions this has been effected in prior art devices by exposing when desired one or more further flow passages for the hydraulic fluid by means of some further valve body or action. Common to these prior art structures is that they are very complicated and thus expensive and also that they are slow in their action. A vehicle shock however, should be capable of changing the restriction characteristics very fast, i.e. in a shorter time than 5 ms, and the arrangement employed should not be too power-consuming.

An example of prior controllable restriction valve device is disclosed in JP No. A 57 173629. According to said publication a solenoid-operated valve means is adapted to be pressed against the mouth of at least one of a plurality of hydraulic fluid flow passages through a piston. The flow area thus is reduced and the restricting action and hence the damping action increased.

Another example of a previously known adjustable restriction valve device is GB No. A 2 112 104. With the exception of the fact that the adjustment of the characteristics of the restriction valve device is obtained by angularly adjusting a member provided with flow passages so as to expose a greater or smaller number of flow passages, the basic operation in principle is the same as in the aforementioned Japanese publication. The restriction valve device of this British reference also utilizes electromagnetic actuation although not in connection with a real solenoid mechanism.

A further example of an adjustable restriction valve device in connection with the shock absorbers is EP No. A 0123365. This European publication discloses a double-acting hydraulic shock absorber having a restriction valve device comprising a control body which is also provided with a solenoid and adapted to effect, by energizing the solenoid, an axial displacement of a closure means in order to expose at least one further flow passage for the hydraulic fluid. As a result greater flow rates through the restriction valve device are provided for and hence a reduced or smaller damping action.

SUMMARY OF THE INVENTION

The main object of the present invention is to provide a restriction valve device of the aforementioned kind which is much simpler in design and, less expensive, and which acts quicker than the prior art devices, the restriction valve device of the present invention being based on a principle that is different from the approach used in the prior art, namely the arrangement of the present invention does not increase the hydraulic liquid flow so as to decrease the restricting action as in the prior art but instead operates to change the restricting action by causing the pressure fluid to act solely by its pressure and without any fluid flow onto the valve body of the restriction valve device. According to the present invention this object is obtained by providing a closed variable space which is confined between the valve seat member and the valve body, an auxiliary opening being connected with said space so as to admit, when a closure element associated with said auxiliary opening is open, the pressure fluid to said auxiliary opening and thus apply also the pressure of said fluid onto said valve body and hence provide for an increased pressure force on said body against the force of a biasing spring so as to change the functional characteristics of the restriction valve device.

BRIEF DESCRIPTION OF THE DRAWINGS

By way of example the invention will be further described below with reference to the accompanying drawing in which.

DESCRIPTION OF THE PREFERRED EMBODIMENTS

Figure 1:
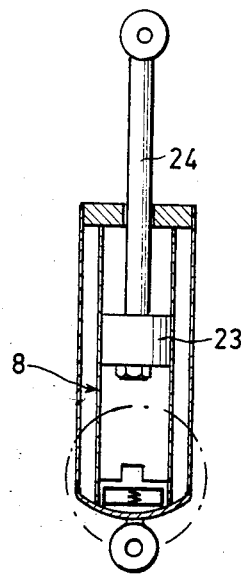
FIG. 1 is a diagrammatical longitudinal section through a shock absorber of a so-called twin-chamber type.

Although the restriction valve device according to the present invention can be applied in many different connections, its advantages are most clearly evident as applied to vehicle shock absorbers. Such absorbers mainly are of two types, namely (a) so-called gas-dampers and (b) so-called twin-chamber dampers. The first-mentioned type of shock absorber a cylinder, a piston with a piston rod, and a sealed volume filled with gas under a pressure of between 10 and 30 bar. Through a diaphragm the pressure acts on hydraulic liquid and prevents the liquid from starting to cavitate during the operation of the shock absorber. The latter type of shock absorber consists of two cylinders, namely an outer and an inner cylinder, a piston with a piston rod, and a valve in the bottom of the shock absorber. The outer cylinder provides for expansion of the liquid during compression of the damper. This space has to be present due to the reduction of volume which occurs in the inner cylinder when the piston rod moves downwardly (as seen in FIG. 1 of the drawing). The present inventive restriction valve device can be applied to shock absorbers of both said kinds. When used in a gas damper a valve is mounted at each side of the piston, when used in a twin-chamber damper a restriction valve device according to the invention is disposed in the bottom of the inner cylinder and is provided in the piston. In the following description the invention has been disclosed as applied to such a twin-chamber damper but of course this forms no limitation of the invention.

Figure 2:
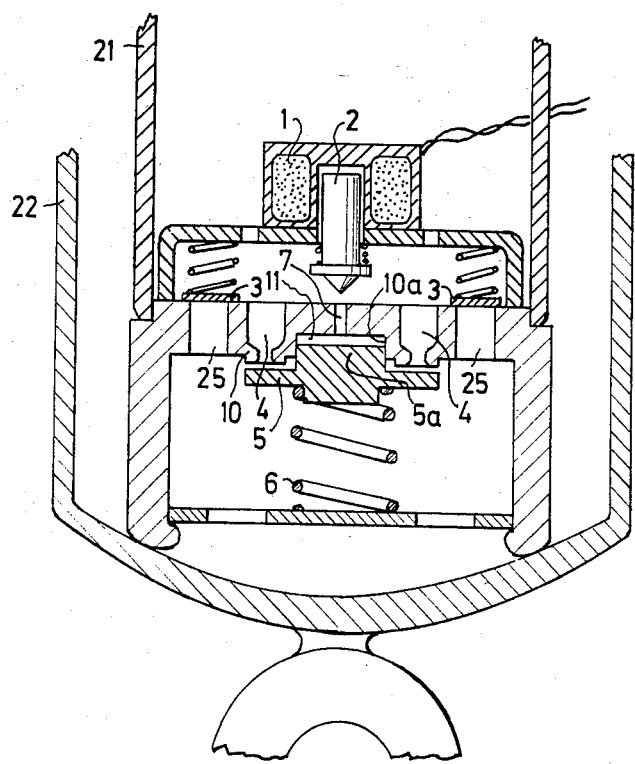
FIG. 2 illustrates in greater detail the portion of said longitudinal section indicated by broken lines.

As known, a so-called twin-chamber damper of the type shown in FIG. 1 operates in the following manner. When piston 23 moves downwards (as illustrated in FIG. 1) to compress the shock absorber the damper is so designed that the liquid in the shock absorber will not be subjected to any sub-atmospheric pressure due to the liability of the liquid to cavitate. Should cavitation occur, the damping ability would be drastically impaired. Therefore, when compressing the damper no pressure differential exists on either side of the piston 23 since a check valve is mounted in the piston. The damping force is created by restricting the liquid flow through the bottom valve (shown in greater detail in FIG. 2) when the liquid passes from the inner to the outer cylinder. The over-atmospheric pressure acts on the area of the piston rod.

In expansion of such a twin-chamber absorber the damping force is formed due to the pressure differential across the piston. In the piston is mounted a restriction valve device like that shown in FIG. 2, which gives the desired damping characteristics. The increase in volume which occurs when the piston rod moves upwardly (as seen in FIG. 1) results in a suction of liquid from the outer to the inner cylinder through a check valve.

The present invention relates to an improved restriction valve device for use in the aforementioned manner, and the basic thought is that by said valve device two different kinds of restriction of the liquid flow are obtained. Said change of restriction characteristics futhermore has to occur very fast (faster than 5 ms) and does not require too much power. In the present embodiment a valve device according to the invention is illustrated as mounted in the bottom of a cylinder of the shock absorber. In a complete shock absorber of this kind there is also a similar valve mounted in the piston.

As illustrated in the drawing, a shock absorber of the twin-chamber type comprises an inner cylinder 21, concentrically arranged within an outer cylinder 22. Within the inner cylinder 21 is longitudinally movably mounted a piston 23 with an associated piston rod 24. In the bottom of the inner cylinder 21 is a double-acting valve mechanism which comprises a valve seat member 10 that is provided with at least one main opening 4 for the passage of the pressure fluid and at least one auxiliary opening 7 for the pressure fluid. The main opening 4 is closable at the outlet side by means of a movable valve body 5, biased against the valve seat member 10 by means of a biasing spring 6 as known per se. Furthermore, in the valve seat member 10 is arranged at least one return passage 25, which at the side of the valve seat member 10 opposite to the valve body 5 is closable by means of a spring biased check valve 3 as also well known.

In a valve mechanism of this kind the damping action of the shock absorber when compressing the same, i.e. when the piston 23 moves towards the valve mechanism, is determined by the pressure over the outlet area of the opening 4 against the force of the biasing spring 6. In order to provide for a change of this power interaction there is arranged according to the present invention an auxiliary opening 7 through the valve seat means 10, said auxiliary opening 7 at its outlet side communicating with a space 11 that is confined between the valve body 5 and the valve seat member 10. In the embodiment illustrated in the drawing said auxiliary opening 7 is located centrally of the valve seat means 10 and opens into the bottom of a cylindrical recess 10a, into which extends sealingly and slidable movable a corresponding cylindrical central projection 5a of the valve body 5. The end of auxiliary opening 7 remote from confined space 11 can be selectively opened or closed by a closure member 2. When closure member 2 is in the position illustrated in FIG. 2, the over-atmospheric pressure occuring in the cylinder 21 upon compression of the shock absorber acts on the valve body 5 through the auxiliary opening 7 and the space 11 and thus creates an additional pressure force on the valve body 5 which is counter-directed to the force of the biasing spring 6. As a result the valve body 5 will be urged further away from the opening 4 of the valve means 10. However, no flow of pressure fluid occurs through the auxiliary opening 7 and the space 11 across the projection 5a of the valve body 5.

Although in the illustrated and above-described embodiment only one auxiliary opening 7 is used and said opening is located centrally, many modifications are of course possible in this connection in order to obtain the same action which will be obvious to those skilled in the art. Thus there might be a plurality of auxilary openings 7, for instance circumferentially equally spaced around the longitudinal axis of the shock absorber in a manner similar to the main openings 4, and instead of a piston-like projection 5a on the valve body 5 the recess 10a in the valve seat means 10 might be covered by means of a diaphragm or the like (not illustrated) so as to form the confined space 11 for actuation of the valve body 5.

According to the invention the auxiliary opening 7 is closable by means of a movable closure member 2 which is movable from the exterior of the shock absorber in a suitable manner known per se, e.g. by means of a solenoid 1.

What is claimed is:

1. In a restriction valve device for hydraulic pressure fluid in a vehicle shock absorbing mechanism, said valve device being of the type comprising a valve seat member having at least one main opening for the passage of said pressure fluid, said main opening being closable by means of a movable spring-biased valve body, and at least one auxiliary opening for the pressure fluid, said auxiliary opening being selectively closable by a closure element, the improvement wherein said valve device is configured to provide a closed variable space which is confined between the valve seat member and the valve body, the auxiliary opening being connected with said space so that, when the closure element is open, the pressure fluid is admitted through said auxiliary opening to cause the pressure of said fluid so admitted to be exerted on said valve body and hence provide for an increased pressure force on said valve body against the force of the biasing spring so as to change the functional characteristics of the restriction valve device without effecting any significant flow of the pressure fluid via said auxiliary opening.

2. A device according to claim 1 wherein a plurality of said main openings are spaced from one another around an axis of symmetry, the outlet sides of said main openings being closable by means of a disk-shaped portion of said valve body, said auxiliary opening being centrally located along said axis of symmetry, said closed space being provided between a central recess in said valve seat member and a protrusion of said valve body which is slidably movable in said recess and which sealingly engages the sides of said recess.

3. The restriction valve device of claim 1 wherein said valve seat member defines at least one return passage therein for the flow of pressure fluid therethrough in a direction opposite to the direction of pressure fluid flow through said main opening, and spring biased means for closing the end of said return passage which is remote from said valve body.

4. A restriction valve device for hydraulic pressure fluid in a vehicle shock absorbing mechanism, comprising a valve seat member which defines at least one main opening for the passage of hydraulic pressure fluid therethrough, a movable valve body disposed adjacent said main opening, said valve body including a first portion for controlling the flow of pressure fluid through said main opening, spring means for urging said first portion of said valve body toward a closed position to said main opening, an auxiliary opening in said valve seat member for applying the pressure of said pressure fluid to a second portion of said valve body in a force direction opposite to the force exerted on said valve body by said spring means, and control means for selectively opening and closing said auxiliary opening to vary the total force which is exerted by said pressure fluid on said valve body in opposition to the force of said spring means thereby to vary the functional characteristics of said restriction valve device, said auxiliary opening being so located relative to said valve body and valve seat member that there is no significant flow of pressure fluid via said auxiliary opening past said valve seat member when said control means opens said auxiliary opening.

5. The restriction valve device of claim 4 wherein said valve seat member and said second portion of said valve body cooperate with one another to define a confined space the volume of which changes with movement of said valve body relative to said valve seat member, said auxiliary opening communicating with said confined space.

6. The restriction valve device of claim 5 wherein said valve seat member includes a recess, said valve body including a protrusion the sides of which are in sliding sealing engagement with the sides of said recess, said confined space being defined between said protrusion and the portion of said recess which is not occupied by said protrusion.

7. The restriction device of claim 6 wherein said recess and said protrusion are each of cylindrical configuration.

8. The restriction device of claim 7 wherein said auxiliary opening is located at the central axis of said cylindrical recess, a plurality of said main openings being disposed in spaced relation to one another in a circular array surrounding said cylindrical recess.

9. The restriction device of claim 8 wherein said first portion of said valve body includes at least one disk-shaped member attached to and extending radially outward of said cylindrical protrusion in overlying relation to one end of each of said main openings, said second portion of said valve body comprising the end of said protrusion interior of said recess which is disposed in facing relation to said auxiliary opening.

10. A restriction valve device for hydraulic pressure fluid in a vehicle shock absorbing mechanism, comprising a valve seat having at least first and second passages extending therethrough in spaced relation to one another, a movable valve member disposed adjacent one end of each of said first and second passages, spring means for urging said valve member toward said one end of said first and second passages, the other ends of said first and second passages being exposed to the pressure of said hydraulic fluid whereby the pressure of said fluid is communicated via said first and second passages to spaced portions of said valve member to apply pressure forces to said valve member in opposition to the force of said spring means, said valve seat and valve member being so configured that when said valve member moves away from said one end of said first and second passages said hydraulic pressure fluid may flow through said first passage past said valve member but no significant flow of said hydraulic fluid can occur through said second passage past said valve member, whereby said first passage act primarily as fluid flow passage while said second passage acts primarily as a pressure applying passage, and means for selectively closing the other end of said second passage to change the total fluid pressure force which is applied to said valve member in opposition to the force of said spring means thereby to control the functional characteristics of said restriction valve device.

* * * * *